(12) United States Patent
Hansson et al.

(10) Patent No.: US 6,577,100 B1
(45) Date of Patent: Jun. 10, 2003

(54) METHOD AND APPARATUS FOR CONTROLLING A CHARGE CURRENT OF A BATTERY IN A PORTABLE CHARGEABLE ELECTRONIC UNIT

(75) Inventors: H. Magnus Hansson, Malmö (SE); Björn Martin Gunnar Lindquist, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/919,313

(22) Filed: Aug. 28, 1997

Related U.S. Application Data

(63) Continuation of application No. 08/436,831, filed on May 8, 1995, now Pat. No. 5,668,462.

(51) Int. Cl.⁷ .................. H01M 10/44; H01M 10/46
(52) U.S. Cl. ........................... 320/110; 320/128
(58) Field of Search .................. 320/107, 112, 320/128, 110, 130, 133, 139, 141, 106

(56) References Cited

U.S. PATENT DOCUMENTS

| | | |
|---|---|---|
| 4,371,826 A | 2/1983 | Shelly |
| 4,709,202 A | 11/1987 | Koenck et al. |
| 5,115,182 A | 5/1992 | Ehmke et al. |
| 5,164,652 A | 11/1992 | Johnson et al. |
| 5,177,426 A | 1/1993 | Nakanishi et al. |
| 5,237,257 A | 8/1993 | Johnson et al. |
| 5,349,282 A | 9/1994 | McClure |
| 5,367,242 A | 11/1994 | Hulman |
| 5,438,252 A | 8/1995 | Chen et al. |
| 5,668,462 A | * 9/1997 | Hansson et al. |

FOREIGN PATENT DOCUMENTS

| | | |
|---|---|---|
| DE | 43 47 461 A1 | 5/1995 |
| EP | 0 095 072 A1 | 11/1983 |
| EP | 0 148 453 | 12/1984 |
| EP | 0 320 305 B1 | 6/1989 |
| EP | 0 450 783 | 9/1991 |
| EP | 0 544 566 | 6/1993 |
| EP | 0 574 753 | 12/1993 |
| GB | 2 262 401 | 12/1992 |
| WO | 93/21679 A1 | 10/1993 |

* cited by examiner

*Primary Examiner*—Edward H. Tso
(74) *Attorney, Agent, or Firm*—Burns, Doane, Swecker & Mathis, L.L.P.

(57) ABSTRACT

A battery charger charges a battery in a portable chargeable electronic device, such as a cellular phone, with a long-term-constant current, even while the device is used. The charging current is controlled by circuitry in the portable device, avoiding the need for control circuitry in the battery charger or battery. A battery-charger connector that corresponds to the type of battery in the portable device is keyed to fit only a charger that matches the type of battery, thus assuring proper charging of the battery. Alternatively, a simple contact connects the battery charger to the battery. A belt clip covers the battery-charger connector when the battery charger is disconnected to prevent short-circuiting the battery.

23 Claims, 1 Drawing Sheet

METHOD AND APPARATUS FOR CONTROLLING A CHARGE CURRENT OF A BATTERY IN A PORTABLE CHARGEABLE ELECTRONIC UNIT

This application is a continuation of application Ser. No. 08/436,831, filed May 8, 1995 now U.S. Pat. No. 5,668,462.

BACKGROUND

Applicants' invention relates to charging a battery in a portable electronic apparatus, e.g., a mobile radio communication system such as a portable cellular telephone, a cordless phone, a pager, etc. The invention more particularly relates to methods and apparatus for delivering a constant current from a charger to a battery in a cellular phone using control logic in the phone.

Mobile communication technology has evolved from early analog systems, e.g., the NMT450 and NMT900 systems in Scandinavia, the AMPS system in the U.S., and the TACS and ETACS services in the United Kingdom, to more sophisticated digital systems, e.g., the Global System for Mobile Communications (GSM) in Europe and the American Digital Cellular System (ADC) in North America. Modern digital mobile communication systems are capable of voice transmission as well as other digital services, facsimile transmissions, and short message services.

Mobile communication devices like cellular phones should preferably be small, lightweight, and inexpensive, yet exhibit good battery performance and be capable of providing many services. The communication device should not have any unnecessary external connectors, which are expensive and increase the size and weight of the device. To ensure proper operation of a battery-powered communication device, it is critical that the battery is correctly charged (and discharged). Preferably, the communication device should be operable while the battery is charging, so that operation need not be repeatedly interrupted to recharge the battery.

Among the known techniques for charging a battery in a portable communication device is connecting a battery charger to the battery through the communication device. This may be done by placing a cellular phone in a click-in battery-charging holder in a car. A switch is often included that operates only to switch off the charging current when the battery is fully charged. Charge is delivered to the battery only when the cellular phone is placed in the click-in holder. Since charge is depleted during a call, the cellular phone must be put back in the click-holder to recharge the battery and interruption may result. Furthermore, these devices do not distinguish between different types of batteries, so that a cellular phone may be erroneously connected to an inappropriate charger, resulting in incorrect charging and possible damage to the battery.

To correct the problem of incorrect charging, U.S. Pat. Nos. 5,164,652 and 5,237,257, both to Johnson et al., disclose devices for determining the type of battery connected to the charger and adjusting charging parameters accordingly so that the battery is correctly charged. To prevent improperly discharging a battery, U.S. Pat. No. 5,177,426 to Nakanishi et al. discloses a device using circuitry in the charger to stop current from flowing from the battery to the phone. Such devices typically employ logic circuitry that is part of the charger, which increases the cost of the charger and the overall cost of the cellular system.

Other known battery-charging devices include "intelligent batteries" that store information relating to battery condition, number of charges, and number of discharges in circuitry included in the battery pack. Also known are "intelligent chargers" that sense the condition of a connected battery and charge the battery accordingly.

Such devices are undesirable in portable cellular phones because they add components to the battery and charger that increase the overall cost and weight of the phone. It would be preferable to keep all necessary logic circuitry outside of the battery and charger, where it might be more cost effectively integrated with already existing circuitry.

Yet another device for charging a battery is disclosed in European Patent Publication No. EP 0 450 783 A2 by Martensson that shows control logic in a phone for controlling an external charger. In this device, there must be two-way communication between the phone and the external charger, which requires a control wire and results in a complicated battery charging process.

SUMMARY

It is an object of Applicants' invention to control the charging of a battery in a portable chargeable device, such as a cellular phone, by using simple control logic that is easily integrated with existing circuitry in the portable device.

It is another object of Applicants' invention to prevent incorrect charging of a battery with an inappropriate battery charger.

It is another object of Applicants' invention to keep the current level of a battery constant so that the battery is not overcharged, yet not to interrupt operation of the portable device to recharge the battery.

It is another object of Applicants' invention to control the charging of a battery using circuitry in the portable device without requiring control circuitry in the battery charger or battery.

According to Applicants' invention, a battery charger is capable of charging a battery in a portable device, such as a cellular radio telephone, with a long term constant current, even while the device is being used. Charging current is controlled by circuitry within the device, thus avoiding the need for control circuitry in the charger or battery.

According to one aspect of Applicants' invention, a battery-charger connector is keyed to fit only a charger that corresponds to a type of battery in the portable device so that the battery is properly connected to an appropriate battery charger. According to another aspect of the invention, a simple contact is provided to connect a battery charger to the battery. A belt clip may be further provided to cover the battery-charger connector when the charger is not connected to the battery to prevent the battery from being short-circuited.

BRIEF DESCRIPTION OF THE DRAWINGS

The features and advantages of Applicants' invention will become apparent by reading this description in conjunction with the drawings, in which.

DETAILED DESCRIPTION

Figure 1:
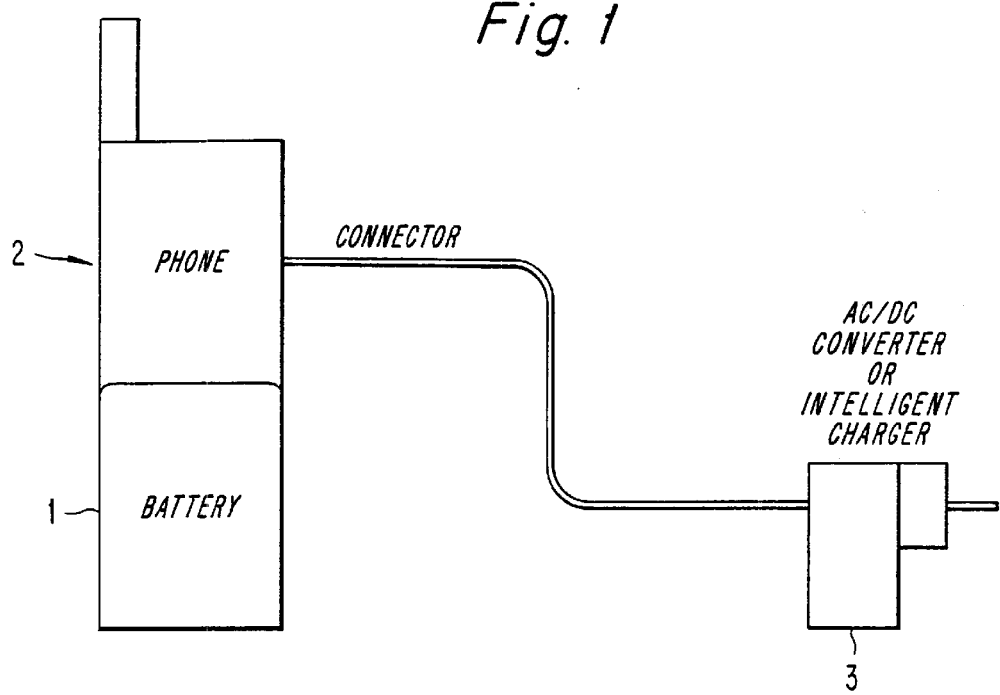
FIG. 1 is a diagram of a cellular system in which a battery charger is connected to a battery in a cellular phone.

FIG. 1 depicts a rechargeable battery 1 in a cellular phone 2 that is connected to a battery charger 3. The phone 2 may be a conventional hand-held cellular phone, which includes a radio transceiver, keypad, and other features conventionally found in a cellular phone that are not described in more detail here. The phone 2 is powered by the battery 1, which may be any of the types conventionally used to power cellular phones.

The charger 3 is a simple an AC/DC or DC/DC converter, which can be adapted, for example, to plug conveniently into a wall outlet or connect to a cigarette lighter in a car. The charger 3 is capable of generating a high level current of approximately 600 milliamperes (mA) for quickly charging the battery. The charger 3 delivers current to the battery 1 and the phone 2 through a battery-charger connector 4.

Figure 2:
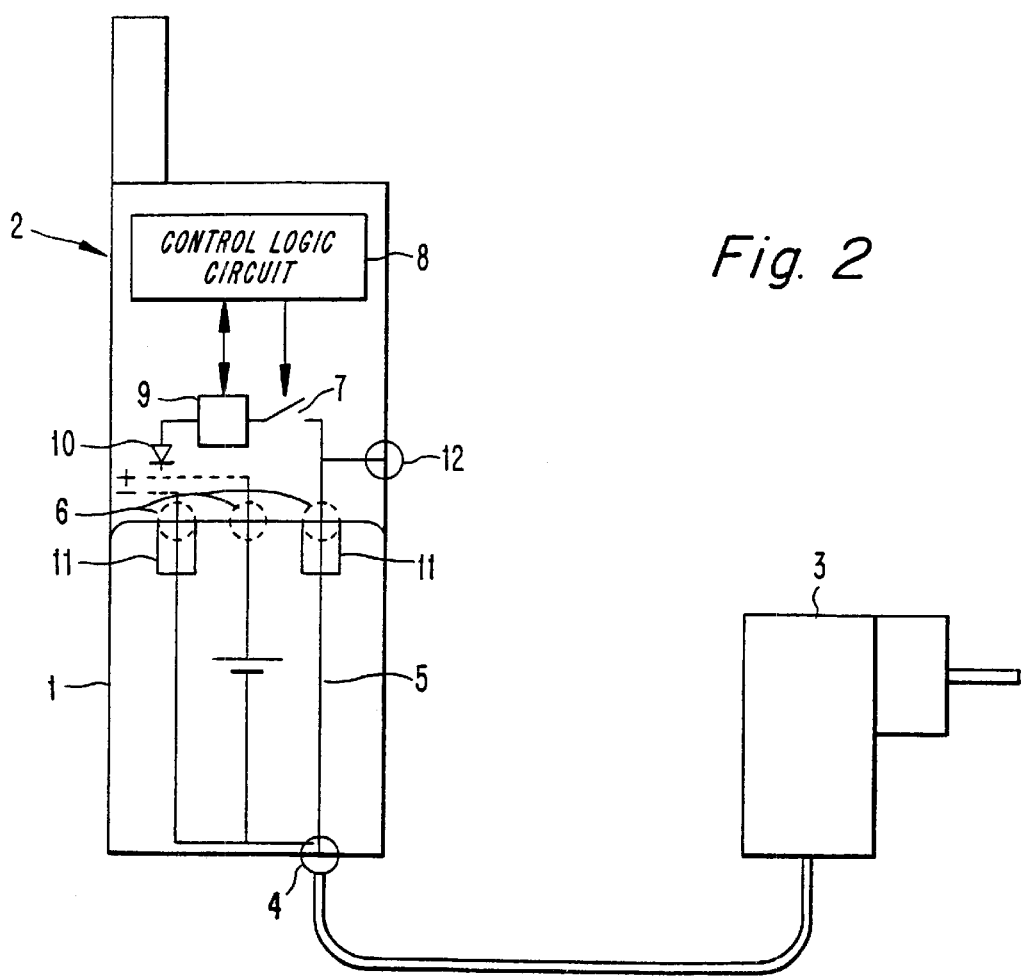
FIG. 2 is a detailed diagram of the battery charger, battery, and cellular phone of FIG. 1.

As depicted in FIG. 2, the battery-charger connector 4 is connected to ground of the battery 1 and delivers a charge through a simple conductor 5 to the phone 2. The battery-charger connector 4 can be placed, for example, at the base of the battery 1 and connected to the battery charger 3 through a cable.

The battery-charger connector 4 can be made differently depending on the type of battery, viz., the connector can be made so that it is keyed to fit only a battery charger of the same type as the battery. This is important because, although different types of batteries, e.g., nickel-cadmium, lead-acid, alkaline, lithium, etc., can often be interchangeably used to power a cellular phone, these batteries have different characteristics and require different charging rates and conditions. For example, a charging current that is proper for one type of battery may be too great for another type of battery, and in extreme situations, may cause the other type of battery to explode. By using a battery-charger connector that is keyed to a battery charger of the same type as the battery in the phone, it is assured that the battery will be properly charged, which will prolong the useful life of the battery.

Referring to FIG. 2, a charging current is fed directly through the battery 1 to the phone 2 by a simple conductor 5 and a battery-phone connector 6. Three contacts are required to connect the battery to the phone through the connector 6. First and second contacts connect the positive and negative terminals of the battery 1 to positive and negative terminals in the phone 2, respectively. A third contact connects the battery to the control circuitry in the phone. These contacts can be manufactured in one piece to minimize cost.

The control circuitry in the phone comprises a switch 7, a control logic circuit 8, and a current sensor 9. The switch 7 is closed when the battery is being charged and opened otherwise. By variably opening and closing, the switch 7 controls the flow of current from the charger. The control logic circuit 8 operates the switch and can be easily incorporated as a small part of existing circuitry in the phone. The control logic circuit 8 detects the state of the battery and communicates with the current sensor 9. Based on this information, the control logic circuit 8 opens and closes the switch 7, controlling the current flow from the charger 3 such that the current flow is constant over a long period of time.

The switch 7, control logic 8, and current sensor 9 can be easily integrated with existing circuitry in the phone so that the phone's circuitry is kept simple. Since the charging current is controlled by the control circuitry in the phone, there is no need for control circuitry in the battery and charger, and thus the battery and charger can be made as simple as possible. A low-cost, unregulated AC/DC converter or DC/DC converter can be used as the battery charger 3, and any battery conventionally used in cellular systems can be used as the battery 1, resulting in a simple and inexpensive overall communication device. Furthermore, using a simple charger and conventional battery makes it is easy to obtain replacements in the event of charger/battery failure, so the communication device can be easily maintained in proper working order.

The switch 7 is opened and closed by the control logic circuit 8, in response to information from the current sensor 9, at a frequency and with a duty cycle that results in the delivery of a long-term-constant current flow from the charger. To charge a discharged battery, the current level is set high, e.g., at 600 mA, for a quick charge. After the control logic circuit 8 determines that the battery is fully charged, the charging current is switched to a low value by operation of the switch 7 to avoid over-charging and damaging the battery.

Using the same control logic circuitry 8 in the phone that is used for the quick charge, the charging current is switched on by operation of switch 7 when the phone is put into operation. The charging current is set to a level that corresponds to the normal amount of current consumed by phone operation. Thus, the battery is kept fully charged without over-charging, even during operation of the phone. Since the same circuitry is used for quick charging and for normal charging during phone operation, the cost and size of the overall communication device are reduced.

A rectifier 10, such as a diode, is connected in series with the switch 7 and the current sensor 9 as a safety precaution. The rectifier 10 prevents a short circuit of the battery in the event of a short circuit in the charger 3 or in the battery-charger connector 4. The switch 7, current sensor 9, and rectifier 10 can be connected in series in a number of ways that will be apparent to those of skill in this art.

A simple battery charging contact may be used instead of or together with the battery-charger connector 4. For example, two small contacts 11 may be disposed on the back of the phone for connection with the charger 3. By placing these contacts on the back of the phone, the battery can be charged through a simple cradle or click-in holder.

The contacts 11 may be hidden behind a belt clip. The belt clip permits a user to attach the phone to a belt or some other article of clothing, thus permitting the phone to be carried while the hands are left free. The belt clip also ensures a good connection by avoiding short circuiting when the phone is not in a holder, e.g., due to contact with conductive objects such as keys, etc. For extra security against short circuiting, the rectifier 10 could be used in connection with the contacts 11.

The charger could also be directly connected to the battery 1 through a contact 12 on the phone, although this might be more expensive and might preclude keying of a certain battery to a certain charger. The contact 12 could be disposed, for example, on the side of the phone 2 for easy access.

Applicants' invention, as described above, provides a battery charger capable of charging a battery in a cellular unit with a long-term-constant current, even while the unit is being used. Charge current is controlled by circuitry in the cellular unit, thus avoiding the need for control circuitry in the charger or battery. A battery-charger connector is keyed to fit only a charger that corresponds to the type of battery in the phone, thus assuring proper charging. A belt clip may be provided to cover the battery-charger connector when the charger is not connected to the battery to prevent the battery from being short-circuited.

While an embodiment of Applicants' invention in a cellular phone has been described above for illustrative purposes, the invention is not limited to cellular phone systems. Applicants' invention applies to various mobile communication systems, e.g., pagers, cordless phones, etc., as well as to any portable chargeable electronic apparatus. This application contemplates any and all modifications that fall within the spirit and scope of Applicants' invention as defined by the following claims.

What is claimed is:

1. A method of controlling a charging current of a battery in a portable chargeable electronic unit, including the steps of:
   delivering a charging current from a battery charger to the battery in the portable chargeable electronic unit; and
   directly controlling flow of the charging current using control logic in the portable chargeable electronic unit to variably interrupt the charging current.

2. The method of claim 1, wherein the portable chargeable electronic unit is a mobile communication unit.

3. The method of claim 1, wherein one of an AC/DC converter and a DC/DC converter is used as the battery charger.

4. The method of claim 1, wherein the charging current is delivered through different battery-charger connectors for different types of batteries.

5. The method of claim 1, wherein the charging current is delivered from the battery charger to the battery through a contact.

6. The method of claim 5, wherein the contact is covered by a clip.

7. The method of claim 1, wherein the controlling step includes the steps of switching the charging current delivered from the battery charger on and off.

8. A method of controlling a charging current of a battery in a portable chargeable electronic unit, including the steps of:
   delivering a charging current from a battery charger to the battery in the portable chargeable electronic unit; and
   directly controlling flow of the charging current using control logic in the portable chargeable electronic unit by switching the charging current delivered from the battery charger on and off such that a long-term-constant current is obtained.

9. The method of claim 1, wherein the controlling step includes the step of sensing a current level of the charging current delivered from the battery charger.

10. The method of claim 1, wherein the controlling step includes the steps of:
    sensing a current level of the charging current delivered from the battery charger; and
    switching the charging current delivered from the battery charger on and off based on the sensed current level.

11. The method of claim 7, wherein the charging current is switched on and off such that a long-term-constant current is obtained.

12. An apparatus for controlling a charging current of a battery in a portable chargeable electronic unit, comprising:
    means for delivering a charging current from a battery charger to the battery in the portable chargeable electronic unit;
    means, comprising a control logic circuit in the portable chargeable electronic unit, for directly controlling flow of the charging current to variably interrupt the charging current.

13. The apparatus of claim 12, wherein the portable chargeable electronic unit is a mobile communication unit.

14. The apparatus of claim 12, wherein the battery charger is one of an AC/DC converter and a DC/DC converter.

15. The apparatus of claim 12, wherein the delivering means comprises different battery connectors for corresponding different types of batteries.

16. The apparatus of claim 12, wherein the delivering means is a contact.

17. The apparatus of claim 16, wherein the contact is covered by a clip.

18. The apparatus of claim 12, wherein the controlling means includes means for switching the charging current delivered from the battery charger on and off.

19. An apparatus for controlling a charging current of a battery in a portable chargeable electronic unit, comprising:
    means for delivering a charging current from a battery charger to the battery in the portable chargeable electronic unit;
    means, comprising a control logic circuit in the portable chargeable electronic unit, for directly controlling flow of the charging current by switching the charging current delivered from the battery charger on and off to obtain a long-term-constant current.

20. The apparatus of claim 12, wherein the controlling means includes means for sensing a level of the charging current delivered from the battery charger.

21. The apparatus of claim 12, wherein the controlling means includes:
    means for sensing a level of the charging current delivered form the battery charger; and
    means for switching the charging current delivered from the battery charger on and off based on the level sensed by the sensing means.

22. An apparatus for controlling a charging of a battery adapted to connect to a portable chargeable electronic unit, comprising:
    means, in the portable chargeable electronic unit, for delivering a charging current from a battery charger to the battery; and
    means, comprising a control logic circuit in the portable chargeable unit, for directly controlling flow of the charging current from the battery charger to variably interrupt the charging current.

23. The apparatus of claim 18, wherein the switching means switches the charging current on and off to obtain a long-term-constant current.

* * * * *